United States Patent
Shigeta et al.

(10) Patent No.: US 10,541,463 B2
(45) Date of Patent: Jan. 21, 2020

(54) GLASS ANTENNA

(71) Applicant: MAZDA MOTOR CORPORATION, Hiroshima (JP)

(72) Inventors: Kazuo Shigeta, Shunan (JP); Tatsuaki Taniguchi, Aki-gun (JP); Yoshiaki Hirasa, Hiroshima (JP); Koichi Miyake, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/763,658

(22) PCT Filed: Mar. 16, 2017

(86) PCT No.: PCT/JP2017/010654
§ 371 (c)(1),
(2) Date: Mar. 27, 2018

(87) PCT Pub. No.: WO2017/208569
PCT Pub. Date: Dec. 7, 2017

(65) Prior Publication Data
US 2018/0277924 A1  Sep. 27, 2018

(30) Foreign Application Priority Data
Jun. 3, 2016  (JP) .................................. 2016-111702

(51) Int. Cl.
*H01Q 1/32* (2006.01)
*H01Q 1/12* (2006.01)
(Continued)

(52) U.S. Cl.
CPC ......... *H01Q 1/1271* (2013.01); *H01Q 1/1278* (2013.01); *H01Q 5/378* (2015.01); *B60J 1/002* (2013.01); *B60S 1/026* (2013.01)

(58) Field of Classification Search
CPC .............. H01Q 1/1271; H01Q 1/1278; H01Q 21/28–21/30; H01Q 1/32
See application file for complete search history.

(56) References Cited

U.S. PATENT DOCUMENTS

| 7,079,079 B2* | 7/2006 | Jo ........................... H01Q 1/243 343/700 MS |
| 2004/0056810 A1* | 3/2004 | Oka ..................... H01Q 1/1278 343/713 |

(Continued)

FOREIGN PATENT DOCUMENTS

| EP | 2207239 A1 | 7/2010 |
| EP | 2 610 959 A2 | 7/2013 |

(Continued)

OTHER PUBLICATIONS

Extended European Search Report issued by the European Patent Office dated Feb. 28, 2019, which corresponds to EP17806131.3-1205 and is related to U.S. Appl. No. 15/763,658.

(Continued)

*Primary Examiner* — Dameon E Levi
*Assistant Examiner* — Hasan Z Islam
(74) *Attorney, Agent, or Firm* — Studebaker & Brackett PC

(57) ABSTRACT

The present application discloses a glass antenna arranged on a vehicular window glass. The glass antenna includes: a feeding terminal connected to an antenna amplifier; a first antenna connected to the feeding terminal and set so as to receive a radio frequency signal in a first frequency band which has a first wavelength at a central frequency of the first frequency band; a coupling element having a length set based on a length obtained by multiplying one-half of the first wavelength by a glass reduction rate, coupling element being connected to the feeding terminal; and a second antenna capacitively coupled to the coupling element and set so as to receive a radio frequency signal in a second frequency band which has a second wavelength at a central frequency of the second frequency band.

7 Claims, 5 Drawing Sheets

(51) Int. Cl.
*H01Q 5/378* (2015.01)
*B60J 1/00* (2006.01)
*B60S 1/02* (2006.01)

(56) References Cited

U.S. PATENT DOCUMENTS

2010/0220020 A1    9/2010  Tadokoro et al.
2011/0043419 A1\*  2/2011  Noguchi .............. H01Q 1/1278
                                           343/712

FOREIGN PATENT DOCUMENTS

| EP | 3 101 733 A1 | 12/2016 |
| JP | H08-107306 A | 4/1996 |
| JP | H09-153716 A | 6/1997 |
| JP | 2007-096475 A | 4/2007 |
| JP | 2013-138294 A | 7/2013 |
| JP | 2015-142162 A | 8/2015 |

OTHER PUBLICATIONS

International Search Report issued in PCT/JP2017/010654; dated May 30, 2017.

\* cited by examiner

GLASS ANTENNA

TECHNICAL FIELD

The present invention relates to a glass antenna arranged on a vehicular window glass.

BACKGROUND ART

A defogger and a glass antenna which are arranged on a rear window glass of a vehicle (e.g. an automobile) are already known. The defogger has printed heater wires. When a current is supplied to the heater wires, the defogger may defog the rear window glass. The glass antenna has printed conductive wires. For example, the glass antenna may receive FM radio broadcasts.

One of known glass antennas has a plurality of antenna elements and a feeding terminal. One of the antenna elements is a first antenna element formed from conductive wires printed on a rear window glass. The feeding terminal is connected not only to the first antenna element but also to a receiver through an antenna amplifier. The other two of the antenna elements are connected to the feeding terminal. A second antenna element is set so as to receive radio broadcasts in a frequency band different from a third antenna element. For example, the second antenna element is set so as to receive FM radio broadcasts having a frequency band of 88 to 108 MHz whereas the third antenna element is set so as to receive digital radio broadcasts (DAB) having a frequency band of 174 to 240 MHz.

Patent Document 1 discloses a glass antenna having a feeding terminal, a first element and a second element. The feeding terminal is connected to an antenna amplifier. The first and second elements are connected to the feeding terminal. The second element includes a main body portion extending from the feeding terminal; and a fold-back portion which is folded back from an end portion of the main body portion so as to be arranged along the main body portion. The glass antenna of Patent Document 1 may receive FM radio broadcasts and digital radio broadcasts.

If an FM antenna and a digital radio antenna are connected to one feeding terminal, an antenna amplifier and the feeding terminal are shared by the FM antenna and the digital radio antenna. Accordingly, a glass antenna may be formed from fewer parts. In addition, the glass antenna does not require an excessively wide arrangement region. However, a structure in which the FM antenna and the digital radio antenna are connected to one feeding terminal is more likely to face a risk of reducing receipt sensitivity than a structure in which antenna amplifiers and feeding terminals are individually allocated to the FM antenna and the digital radio antenna.

PATENT DOCUMENT

Patent Document 1: JP 2015-142162 A

SUMMARY OF INVENTION

An object of the present invention is to provide a glass antenna having a structure in which an antenna amplifier and a feeding terminal are shared by two antennas, the glass antenna being configured to maintain high receipt sensitivity of the two antennas.

A glass antenna according to one aspect of the present invention is arranged on a vehicular window glass. The glass antenna includes a first antenna configured to receive a radio frequency signal in a first frequency band which has a first wavelength at a central frequency of the first frequency band; a coupling element having a length set on the basis of a length obtained by multiplying one-half of the first wavelength by a glass reduction rate defined as a value which is obtained by dividing a propagation velocity of a radio wave in the vehicular window glass by a propagation velocity of the radio wave in air; a feeding terminal connected to an antenna amplifier, the first antenna and the coupling element and a second antenna configured to receive a radio frequency signal in a second frequency band which has a second wavelength at a central frequency of the second frequency band and send the received radio frequency signal to the antenna amplifier thorough the coupling element to which the second antenna is capacitively coupled and the feeding terminal.

The aforementioned glass antenna has a structure in which the antenna amplifier and the feeding terminal are shared by two antennas, and may maintain high receipt sensitivity of the two antennas.

Objects, features, and advantages of the present invention will become more apparent from the following detailed description and accompanying drawings.

DESCRIPTION OF EMBODIMENTS

First Embodiment

Figure 1:
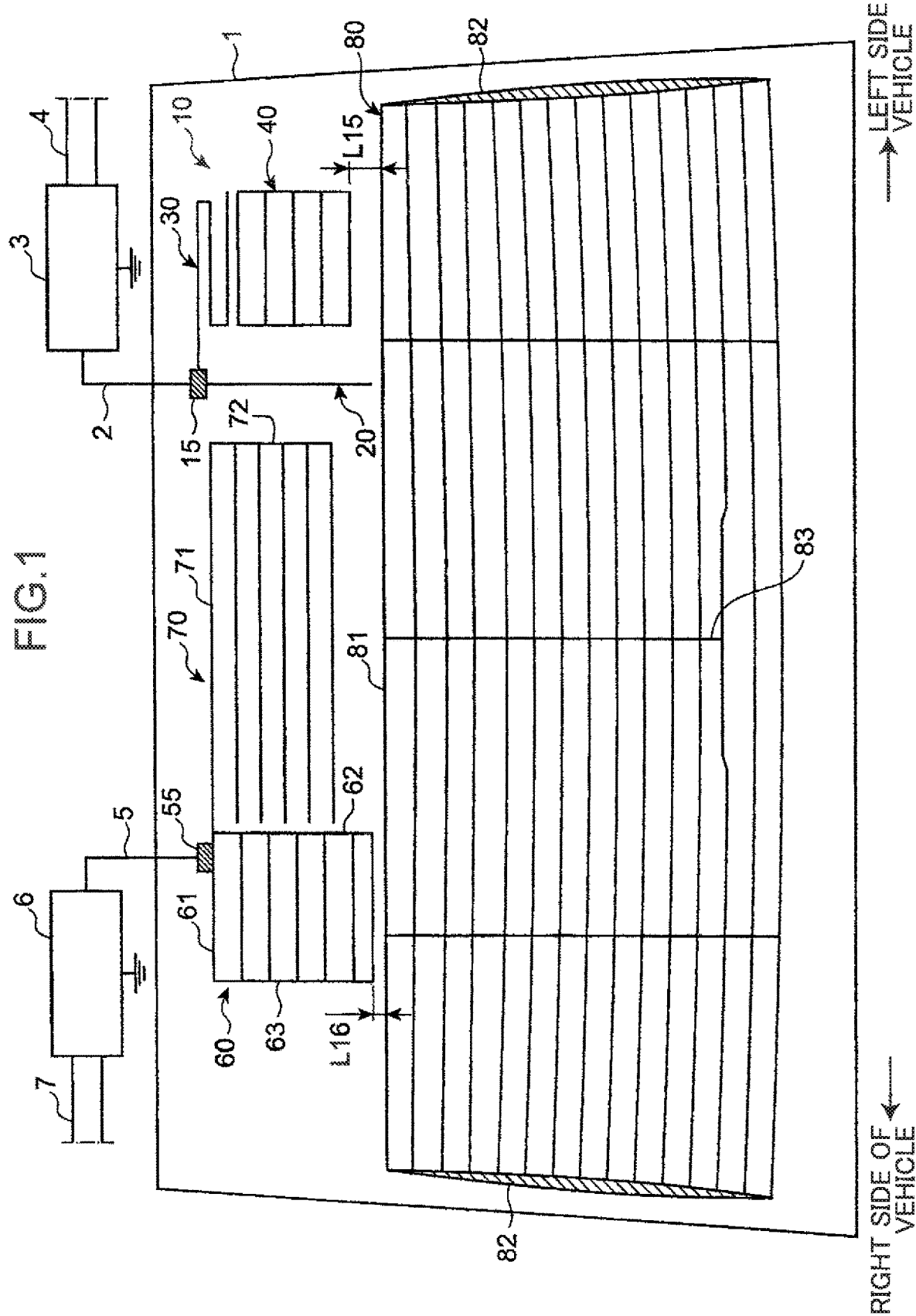
FIG. 1 is a schematic view of a glass antenna according to the first embodiment.

FIG. 1 is a schematic view of a glass antenna 10 according to the first embodiment. As shown in FIG. 1, the glass antenna 10 is arranged on a rear window glass 1. FIG. 1 shows the glass antenna 10 observed from the in-vehicle side. The directional terms such as "left", "right", "up", and "down" are used on the basis of a vehicle. With regard to the present embodiment, the vehicular window glass is exemplified by the rear window glass 1.

The glass antenna 10 includes a feeding terminal 15, a first antenna 20, a coupling element 30 and a second antenna 40. The feeding terminal 15 is arranged on an upper side of the rear window glass 1 (i.e. in a region above a virtual horizontal plane extending through the center of the rear window glass 1). The feeding terminal 15 is arranged in a left region of the rear window glass 1 (i.e. in a region on the left of a virtual vertical plane extending through the center of the rear window glass 1). With regard to the present embodiment, one side in the vehicle width direction is exemplified by the left region.

The first antenna 20 is connected to the feeding terminal 15. The coupling element 30 is also connected to the feeding terminal 15. The second antenna 40 is arranged below the coupling element 30. The second antenna 40 is capacitively coupled to the coupling element 30. Each of the first antenna 20, the coupling element 30 and the second antenna 40 is made of conductive silver paste which is printed on the rear window glass 1 as conductive wires.

Figure 2:
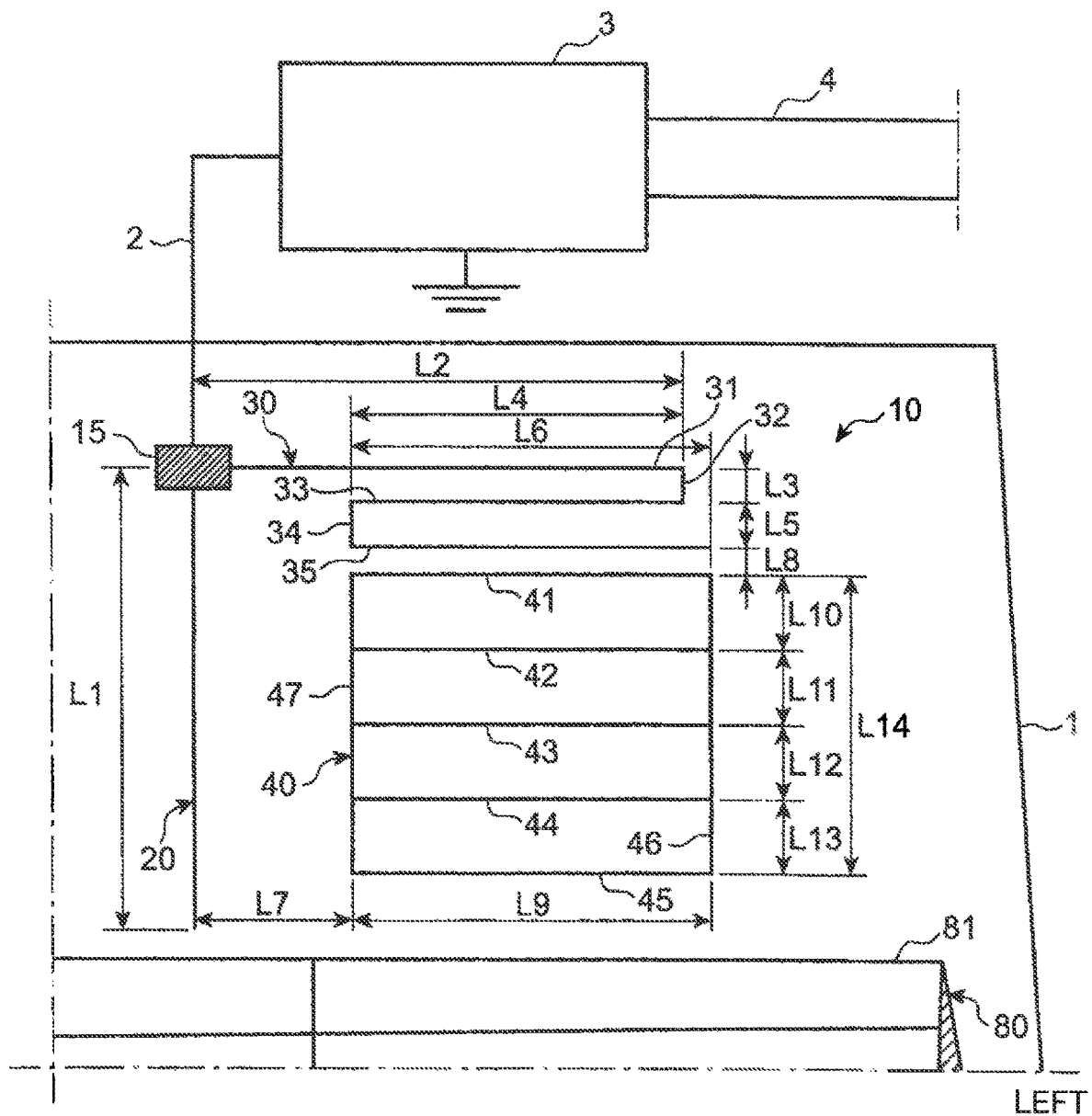
FIG. 2 is a partial enlarged view of the glass antenna shown in FIG. 1.

FIG. 2 is a partial enlarged view of the glass antenna 10. As shown in FIG. 2, the first antenna 20 extends in the vertical direction of the rear window glass 1. The feeding terminal 15 is connected to the top of the first antenna 20.

The first antenna 20 is set so as to receive radio frequency signals in a first frequency band which has a first wavelength at the central frequency of the first frequency band. With regard to the present embodiment, the first antenna 20 is a digital radio antenna set so as to receive digital radio broadcasts in the first frequency band (digital radio broadcast band) of 174 to 240 MHz of which central frequency is 207 MHz. A length L1 of the first antenna 20 is set to 170 mm. The first antenna 20 may receive digital radio broadcasts in the first frequency band of 174 to 240 MHz in cooperation with an antenna connection wire 2 of about 150 mm (described later) which functions as a part of the antenna. The principles of the present embodiment are not limited to particular lengths of the first antenna 20 and the antenna connection wire 2.

An antenna amplifier 3 is connected to the feeding terminal 15 of the glass antenna 10 through the antenna connection wire 2 of about 150 mm. Coaxial cables 4 connected to a receiver (not shown) are connected to the antenna amplifier 3. A radio wave in the first frequency band received by the first antenna 20 is transmitted from the feeding terminal 15 to the receiver. The antenna amplifier 3 amplifies the radio wave transmitted from the feeding terminal 15 to the receiver. The antenna amplifier 3 is ground-fixed on a roof portion of the vehicle.

The coupling element 30 extends leftward from the feeding terminal 15. In short, the coupling element 30 is arranged on the left of the feeding terminal 15. The coupling element 30 has a length which is set on the basis of a length obtained by multiplying one-half of the first wavelength by a glass reduction rate α of the rear window glass 1, the first wavelength being a wavelength at the central frequency of the first frequency band (with regard to the present embodiment, 174 to 240 MHz) which is set so as to be received by the first antenna 20. With regard to the present embodiment, the glass reduction rate α of the rear window glass 1 is set to 0.7. However, the principles of the present embodiment are not limited to a particular value of the glass reduction rate α.

With regard to the present embodiment, the length of the coupling element 30 is set to 500 mm. However, the principles of the present embodiment are not limited to a particular length of the coupling element 30. For example, the length of the coupling element 30 may be set to a value within a predetermined range (e.g. ±2%) around a length obtained by multiplying one-half of the first wavelength by the glass reduction rate α of the rear window glass 1, the first wavelength being a wavelength at the central frequency wavelength of the first frequency band of 174 to 240 MHz. The aforementioned predetermined range is set so that predetermined receipt sensitivity (e.g. an average receipt sensitivity of no less than −10 dB relative to a dipole antenna) is obtained in frequency characteristics of the first frequency band of 174 to 240 MHz.

As shown in FIG. 2, the coupling element 30 includes a substantially horizontal first lateral portion 31 extending leftward from the feeding terminal 15; a first longitudinal portion 32 extending downward from the left end of the first lateral portion 31; a substantially horizontal second lateral portion 33 extending rightward from the lower end of the first longitudinal portion 32; a second longitudinal portion 34 extending downward from the right end of the second lateral portion 33; and a substantially horizontal third lateral portion 35 extending leftward from the lower end of the second longitudinal portion 34.

A sum total of the lengths of the first lateral portion 31, the first longitudinal portion 32, the second lateral portion 33, the second longitudinal portion 34 and the third lateral portion 35 is set on the basis of a length obtained by multiplying one-half of the first wavelength by the glass reduction rate α of the rear window glass 1, the first wavelength being a wavelength at the central frequency of the first frequency band of 174 to 240 MHz.

With regard to the present embodiment, the length L2 of the first lateral portion 31 is set to 190 mm. The length L3 of the first longitudinal portion 32 is set to 10 mm. The length L4 of the second lateral portion 33 is set to 140 mm. The length L5 of the second longitudinal portion 34 is set to 10 mm. The length L6 of the third lateral portion 35 is set to 150 mm. However, the principles of the present embodiment are not limited to particular lengths of the first lateral portion 31, the first longitudinal portion 32, the second lateral portion 33, the second longitudinal portion 34 and the third lateral portion 35.

The second antenna 40 is situated on the left of the first antenna 20. The second antenna 40 is distant from the first antenna 20 so that there is no capacitive coupling between the first and second antennas 20, 40. The second antenna 40 is situated below the coupling element 30. The second antenna 40 is distant from the coupling element 30 so that there is capacitive coupling between the second antenna 40 and the coupling element 30. With regard to the present embodiment, the distance L7 between the second and first antennas 40, 20 is set to 50 mm. The distance L8 between the second antenna 40 and the coupling element 30 is set to 5 mm. However, the principles of the present embodiment are not limited to particular values of the distance between the second and first antennas 40, 20 and the distance between the second antenna 40 and the coupling element 30.

The second antenna 40 is set so as to receive radio frequency signals in a second frequency band which has a second wavelength at the central frequency of the second frequency band. With regard to the present embodiment, the second antenna 40 is an FM antenna which is set so as to receive FM radio broadcasts in the second frequency band (FM radio broadcast band) of 88 to 108 MHz of which central frequency is 98 MHz.

The second antenna 40 includes substantially horizontal lateral portions extending along the third lateral portion 35 of the coupling element 30. The lateral portions are substantially parallel to each other. The lateral portions include a first lateral portion 41, a second lateral portion 42, a third lateral portion 43, a fourth lateral portion 44, and a fifth lateral portion 45. The first lateral portion 41 is situated at the highest position among the lateral portions. The second lateral portion 42 is situated below the first lateral portion 41. The third lateral portion 43 is situated below the second lateral portion 42. The fourth lateral portion 44 is situated below the third lateral portion 43. The fifth lateral portion 45 is situated below the fourth lateral portion 44. There are substantially regular intervals in the first lateral portion 41, the second lateral portion 42, the third lateral portion 43, the fourth lateral portion 44 and the fifth lateral portion 45.

The second antenna 40 further includes a first longitudinal portion 46 and a second longitudinal portion 47. The first longitudinal portion 46 extends vertically and passes through the left ends of the first lateral portion 41, the second lateral portion 42, the third lateral portion 43, the fourth lateral portion 44 and the fifth lateral portion 45. The second longitudinal portion 47 extends vertically and passes through the right ends of the first lateral portion 41, the second lateral portion 42, the third lateral portion 43, the fourth lateral portion 44 and the fifth lateral portion 45.

With regard to the present embodiment, the length L9 of the first lateral portion 41, the second lateral portion 42, the third lateral portion 43, the fourth lateral portion 44 and the fifth lateral portion 45 is set to 150 mm. The distance L10 between the first and second lateral portions 41, 42, the distance L11 between the second and third lateral portions 42, 43, the distance L12 between the third and fourth lateral portions 43, 44 and the distance L13 between the fourth and fifth lateral portions 44, 45 are set to 30 mm. The length L14 of the first and second longitudinal portions 46, 47 is set to 120 mm. However, the principles of the present embodiment are not limited to particular values of these lengths.

The second antenna 40 of the glass antenna 10 is capacitively coupled to the coupling element 30 which is connected to the feeding terminal 15. Therefore, a radio wave in the second frequency band received by the second antenna 40 is transmitted from the feeding terminal 15 to the receiver. The antenna amplifier 3 amplifies the radio wave in the second frequency band transmitted from the feeding terminal 15 to the receiver. In short, the antenna amplifier 3 amplifies not only the radio wave in the first frequency band received by the first antenna 20 but also the radio wave in the second frequency band received by the second antenna 40.

As described above, the feeding terminal 15 is connected to the coupling element 30 having a length which is set on the basis of a length obtained by multiplying one-half of a wavelength at the central frequency of the first frequency band by the glass reduction rate, the first frequency band being set so as to be received by the first antenna 20. Accordingly, the glass antenna 10 may have high or infinite impedance in the first frequency band. Since the coupling element 30 is capacitively coupled to the second antenna 40 set so as to receive the second frequency band which has the second wavelength at the central frequency of the second frequency band, the glass antenna 10 may maintain high receipt sensitivity of the first and second antennas 20, 40.

As shown in FIG. 1, the glass antenna 10 includes a feeding terminal 55 and a third antenna 60. The feeding terminal 55 and the third antenna 60 are situated on an upper side of the rear window glass 1. The feeding terminal 55 and the third antenna 60 are arranged in a right region of the rear window glass 1 (i.e. in a region on the right of the virtual vertical plane extending through the center of the rear window glass 1). The third antenna 60 is connected to the feeding terminal 55.

The third antenna 60 is set so as to receive radio frequency signals in a third frequency band which has a third wavelength at the central frequency of the third frequency band. With regard to the present embodiment, like the second antenna 40, the third antenna 60 is an FM antenna set so as to receive FM radio broadcasts in the third frequency band (FM radio broadcast band) of 88 to 108 MHz of which central frequency is 98 MHz.

The feeding terminal 55 is connected to the top of the third antenna 60. The third antenna 60 includes substantially horizontal lateral portions 61 extending parallel to each other. The lateral portions 61 include a first lateral portion, a second lateral portion, a third lateral portion, a fourth lateral portion, a fifth lateral portion, a sixth lateral portion and a seventh lateral portion. The first lateral portion is situated at the highest position among the lateral portions 61. The second lateral portion is situated below the first lateral portion. The third lateral portion is situated below the second lateral portion. The fourth lateral portion is situated below the third lateral portion. The fifth lateral portion is situated below the fourth lateral portion. The sixth lateral portion is situated below the fifth lateral portion. The seventh lateral portion is situated at the lowest positon among the lateral portions 61. There are substantially regular intervals in the first to seventh lateral portions. The third antenna 60 further includes a first longitudinal portion 62 and a second longitudinal portion 63. The first longitudinal portion 62 extends substantially vertically and passes through the left ends of the lateral portions 61. The second longitudinal portion 63 extends substantially vertically and passes through the right ends of the lateral portions 61.

With regard to the present embodiment, the length of the first to seventh lateral portions of the third antenna 60 is set to 150 mm. The distance between the first and second lateral portions, the distance between the second and third lateral portions, the distance between the third and fourth lateral portions, the distance between the fourth and fifth lateral portions and the distance between the fifth and sixth lateral portions are set to 30 mm. The distance between the sixth and seventh lateral portions is set to 20 mm. The length of the first and second longitudinal portions 62, 63 is set to 170 mm. However, the principles of the present embodiment are not limited to particular values of these distances and lengths.

An antenna amplifier 6 is connected to the feeding terminal 55 of the glass antenna 10 through an antenna connection wire 5. Coaxial cables 7, which is connected to the receiver, are connected to the antenna amplifier 6. A radio wave in the third frequency band received by the third antenna 60 is transmitted from the feeding terminal 55 to the receiver. The antenna amplifier 6 amplifies the radio wave in the third frequency band transmitted from the feeding terminal 55 to the receiver. The antenna amplifier 6 is ground-fixed on the roof portion of the vehicle.

The third antenna 60 is situated in a position which is distant from the second antenna 40. The third antenna 60 is set so as to receive FM radio broadcasts in the third frequency band which has the third wavelength at the central frequency of the third frequency band. With regard to the present embodiment, the third wavelength is equal to the second wavelength. The third frequency band is equal to the second frequency band. Accordingly, the second and second antennas 40, 60 implement diversity.

A fourth antenna 70 is connected to the feeding terminal 55. The fourth antenna 70 extends leftward from the left ends of the lateral portions 61 of the third antenna 60 connected to the feeding terminal 55. The fourth antenna 70 is situated on the left of the third antenna 60. The fourth antenna 70 is situated on the right of the first antenna 20. The fourth antenna 70 is situated on an upper side of the rear window glass 1. The fourth antenna 70 is situated in a central region of the rear window glass 1 in the vehicle width direction (i.e. in a region between the second and third antennas 40, 60).

The fourth antenna 70 is set so as to receive AM radio broadcasts in a fourth frequency band (AM radio broadcast band) of 500 to 1700 kHz in cooperation with the third antenna 60. The fourth antenna 70 includes substantially horizontal lateral portions 71 extending parallel to each other. The lateral portions 71 include a first lateral portion, a second lateral portion, a third lateral portion, a fourth lateral portion, a fifth lateral portion and a sixth lateral portion. The first lateral portion is situated at the highest position among the lateral portions 71. The second lateral portion is situated below the first lateral portion. The third lateral portion is situated below the second lateral portion. The fourth lateral portion is situated below the third lateral portion. The fifth lateral portion is situated below the fourth lateral portion. The sixth lateral portion is situated at the lowest position among the lateral portions 71. There are substantially regular intervals in the lateral portions 71. The fourth antenna 70 further includes a longitudinal portion 72. The longitudinal portion 72 extends substantially vertically and passes through the left ends of the lateral portions 71.

Each of the third and fourth antennas 60, 70 is made of conductive silver paste which is printed on the rear window glass 1 as conductive wires.

A radio wave in the fourth frequency band which is received by the third and fourth antennas 60, 70 of the glass antenna 10 is transmitted from the feeding terminal 55 to the receiver. The antenna amplifier 6 amplifies the radio wave in the fourth frequency band transmitted from the feeding terminal 55 to the receiver. The antenna amplifier 6 amplifies not only the radio wave in the third frequency band received by the third antenna 60 but also the radio wave in the fourth frequency band received by the third and fourth antennas 60, 70.

A defogger 80 is arranged on the rear window glass 1. The defogger 80 is placed over an area extending from one side (left region) to the other side (right region) in the vehicle width direction of the rear window glass 1. The first antenna 20, the second antenna 40, the third antenna 60, the fourth antenna 70, the feeding terminals 15, 55 and the coupling element 30 are situated above the defogger 80.

The defogger 80 includes heater wires 81 and a pair of bus bars 82. The heater wires 81 are substantially parallel to each other. The heater wires 81 are arranged over an area extending from the left region to the right region of the rear window glass 1. The heater wires 81 are substantially symmetrical. The pair of the bus bars 82 extends substantially vertically. One of these bus bars 82 connects the left ends of the heater wires 81. The other one of the pair of the bus bars 82 connects the right ends of the heater wires 81. A current is supplied to the heater wires 81 from a power supply (not shown) through the bus bars 82. Accordingly, the defogger 80 may defog the rear window glass 1.

The defogger 80 includes conductive wires 83. Each of the conductive wires 83 extends downward from the uppermost heater wire 81 among the heater wires 81, and intersects the heater wires 81. With regard to the present embodiment, the conductive wires 83 are provided in the left region, right region and central region of the rear window glass 1, respectively.

The defogger 80 is situated below the second antenna 40. The defogger 80 is distant from the second antenna 40 so that there is capacitive coupling between the defogger 80 and the second antenna 40. The defogger 80 is situated below the third antenna 60. The defogger 80 is distant from the third antenna 60 so that there is capacitive coupling between the defogger 80 and the third antenna 60. With regard to the present embodiment, the distance L15 between the defogger 80 and the second antenna 40 is set to 30 mm. The distance L16 between the defogger 80 and the third antenna 60 is set to 10 mm. However, the principles of the present embodiment are not limited to particular values of these distances.

The heater wires 81 and the conductive wires 83 of the defogger 80 are formed of conductive silver paste which is printed on the rear window glass 1.

The present inventors have used the glass antenna 10 of the present embodiment to study its frequency characteristics in a digital radio broadcast band and an FM radio broadcast band.

Figure 3:
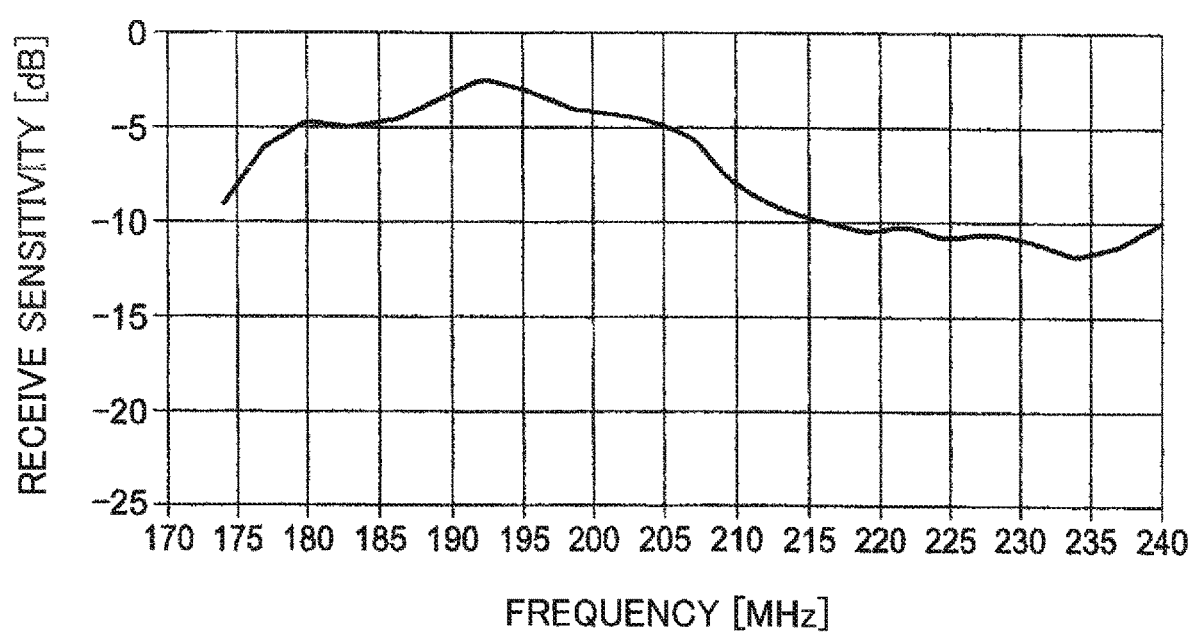
FIG. 3 is a graph showing frequency characteristics of a digital radio broadcast band of the glass antenna.

FIG. 3 is a graph showing frequency characteristics of the glass antenna 10 in the digital radio broadcast band. The horizontal axis of the graph of FIG. 3 represents frequencies in the digital radio broadcast band. The vertical axis of the graph of FIG. 3 represents receipt sensitivity for the frequencies in the digital radio broadcast band. The receipt sensitivity refers to receipt sensitivity obtained before amplification by the antenna amplifier 3. The graph of FIG. 3 shows receipt sensitivity relative to a dipole antenna.

As shown in FIG. 3, the receipt sensitivity for high frequencies in the digital radio broadcast band is lower than the receipt sensitivity for low frequencies in the digital radio broadcast band. However, the average receipt sensitivity for all frequencies of the digital radio broadcast band is no less than −10 dB. Therefore, the glass antenna 10 may have excellent receipt sensitivity.

Figure 4:
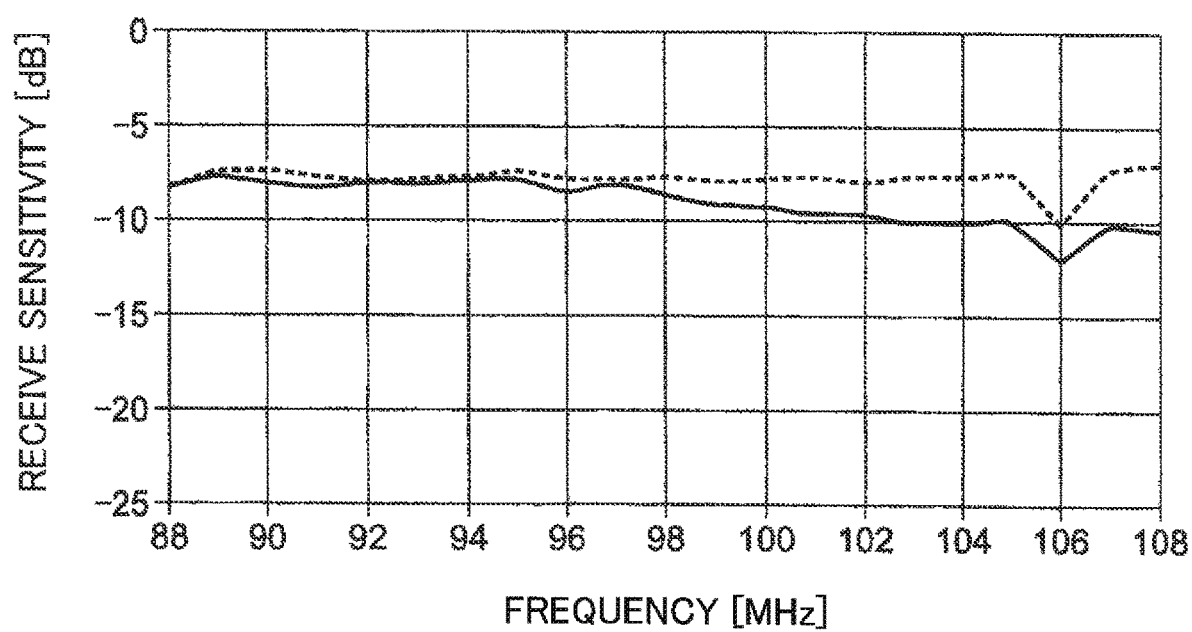
FIG. 4 is a graph showing frequency characteristics of an FM radio broadcast band of the glass antenna.

FIG. 4 is a graph showing frequency characteristics of an FM radio broadcast band of the glass antenna 10. The horizontal axis of the graph of FIG. 4 represents frequencies in the FM radio broadcast band. The vertical axis of the graph of FIG. 4 represents receipt sensitivity for the frequencies in the FM radio broadcast band. The receipt sensitivity refers to receipt sensitivity obtained before amplification by the antenna amplifiers 3, 6. The graph of FIG. 4 shows receipt sensitivity relative to a dipole antenna. Receipt sensitivity measured through the left feeding terminal 15 is represented by a solid line. Receipt sensitivity measured through the right feeding terminal 55 is represented by a dashed line.

As indicated by the solid line of FIG. 4, when the frequency is 106 MHz, the receipt sensitivity measured through the left feeding terminal 15 is lower than receipt sensitivity for other frequencies. However, the average receipt sensitivity for all frequencies of the FM radio broadcast band is no less than −10 dB. Therefore, the glass antenna 10 may have excellent receipt sensitivity.

As indicated by the dashed line of FIG. 4, when the frequency is 106 MHz, the receipt sensitivity measured through the right feeding terminal 55 is lower than receipt sensitivity for other frequencies. However, the average receipt sensitivity for all frequencies of the FM radio broadcast band is no less than −10 dB. Therefore, the glass antenna 10 may have excellent receipt sensitivity.

With regard to the present embodiment, the first antenna 20 connected to the feeding terminal 15 is a digital radio antenna whereas the second antenna 40 which is capacitively coupled to the coupling element 30, which is connected to the feeding terminal 15, is an FM antenna. However, the first and second antennas 20, 40 may be other antennas which receive radio frequency signals such as VHF of 30 to 300 MHz. In this case, the coupling element 30 has a length set on the basis of a length obtained by multiplying one-half of the first wavelength at the central frequency of the first frequency band by the glass reduction rate α of the rear window glass 1, the first frequency band being set so as to be received by the first antenna 20.

The glass antenna 10 according to the present embodiment includes the first antenna 20, the coupling element 30 and the second antenna 40. The first antenna 20 is connected to the feeding terminal 15, which is connected to the antenna amplifier 3. The first antenna 20 is set so as to receive radio frequency signals in the first frequency band which has the first wavelength at the central frequency of the first frequency band. The coupling element 30 has a length set on the basis of a length obtained by multiplying one-half of the first wavelength by the glass reduction rate. The coupling element 30 is connected to the feeding terminal 15. The second antenna 40 is capacitively coupled to the coupling element 30. The second antenna 40 is set so as to receive radio frequency signals in the second frequency band which has the second wavelength at the central frequency of the second frequency band.

Since the feeding terminal 15, to which the first antenna 20 is connected, is connected to the coupling element 30 having a length set on the basis of a length obtained by multiplying one-half of the wavelength at the central frequency of the first frequency band by the glass reduction rate, the glass antenna 10 may have high or infinite impedance in the first frequency band. The coupling element 30 is capacitively coupled to the second antenna 40 set so as to receive the second frequency band different from the first frequency band. The central wavelength of the second frequency band is the second wavelength which is different from the first wavelength. Therefore, the glass antenna 10 may have a lower risk of reducing the receipt sensitivity of the first and second antennas 20, 40 than a structure in which the first and second antennas 20, 40 are connected to the feeding terminal 15. In short, the glass antenna 10 may allow two antennas to share an antenna amplifier and a feeding terminal. In addition, the glass antenna 10 may maintain high receipt sensitivity of two antennas which receive radio frequency signals (e.g. VHF of 30 to 300 MHz).

The first antenna 20 is a digital radio antenna which is set so as to receive digital radio broadcasts whereas the second antenna 40 is an FM antenna which is set so as to receive FM radio broadcasts. Therefore, the glass antenna 10 may allow the digital radio antenna and the FM antenna to share an antenna amplifier and a feeding terminal. In addition, the glass antenna 10 may maintain high receipt sensitivity of the digital radio antenna and the FM antenna.

The feeding terminal 15, the first antenna 20, the coupling element 30 and the second antenna 40 are situated above the defogger 80. The feeding terminal 15 is situated on an upper side of the vehicular window glass 1. Therefore, the first and second antennas 20, 40 may have high receipt sensitivity.

The glass antenna 10 includes the third antenna 60 situated in a position which is distant from the second antenna 40. The third antenna 60 is set so as to receive radio frequency signals in the third frequency band which has the third wavelength at the central frequency of the third frequency band. If the third wavelength is equal to the second wavelength and if the third frequency band is equal to the second frequency band, the second and third antennas 40, 60 implement diversity. Accordingly, the glass antenna 10 may have high receipt sensitivity in the second frequency band.

The second and third antennas 40, 60 are capacitively coupled to the defogger 80 formed on the vehicular window glass 1. The defogger 80 is situated below the second and third antennas 40, 60. Therefore, the defogger 80 may function as an antenna which helps the second and third antennas 40, 60. Accordingly, the second and third antennas 40, 60 may have high receipt sensitivity.

The glass antenna 10 includes the feeding terminal 15, the first antenna 20, the coupling element 30 and the second antenna 40. In addition, the glass antenna 10 includes the feeding terminal 55, the third antenna 60 and the fourth antenna 70. However, the glass antenna 10 does not have to include the feeding terminal 55, the third antenna 60 and the fourth antenna 70.

With regard to the first embodiment, the glass antenna 10 includes the first antenna 20, the coupling element 30 and the second antenna 40. The first antenna 20 is connected to the feeding terminal 15. The first antenna 20 extends vertically. The coupling element 30 is connected to the feeding terminal 15. The coupling element 30 is situated on one side (left region) in the vehicle width direction of the feeding terminal 15. The second antenna 40 is situated below the coupling element 30. The second antenna 40 is capacitively coupled to the coupling element 30. The feeding terminal 15, the first antenna 20, the coupling element 30 and the second antenna 40 are situated above the defogger 80. However, the second antenna 40 which is situated below the coupling element 30 so as to be capacitively coupled to the coupling element 30 may be a defogger.

Second Embodiment

Figure 5:
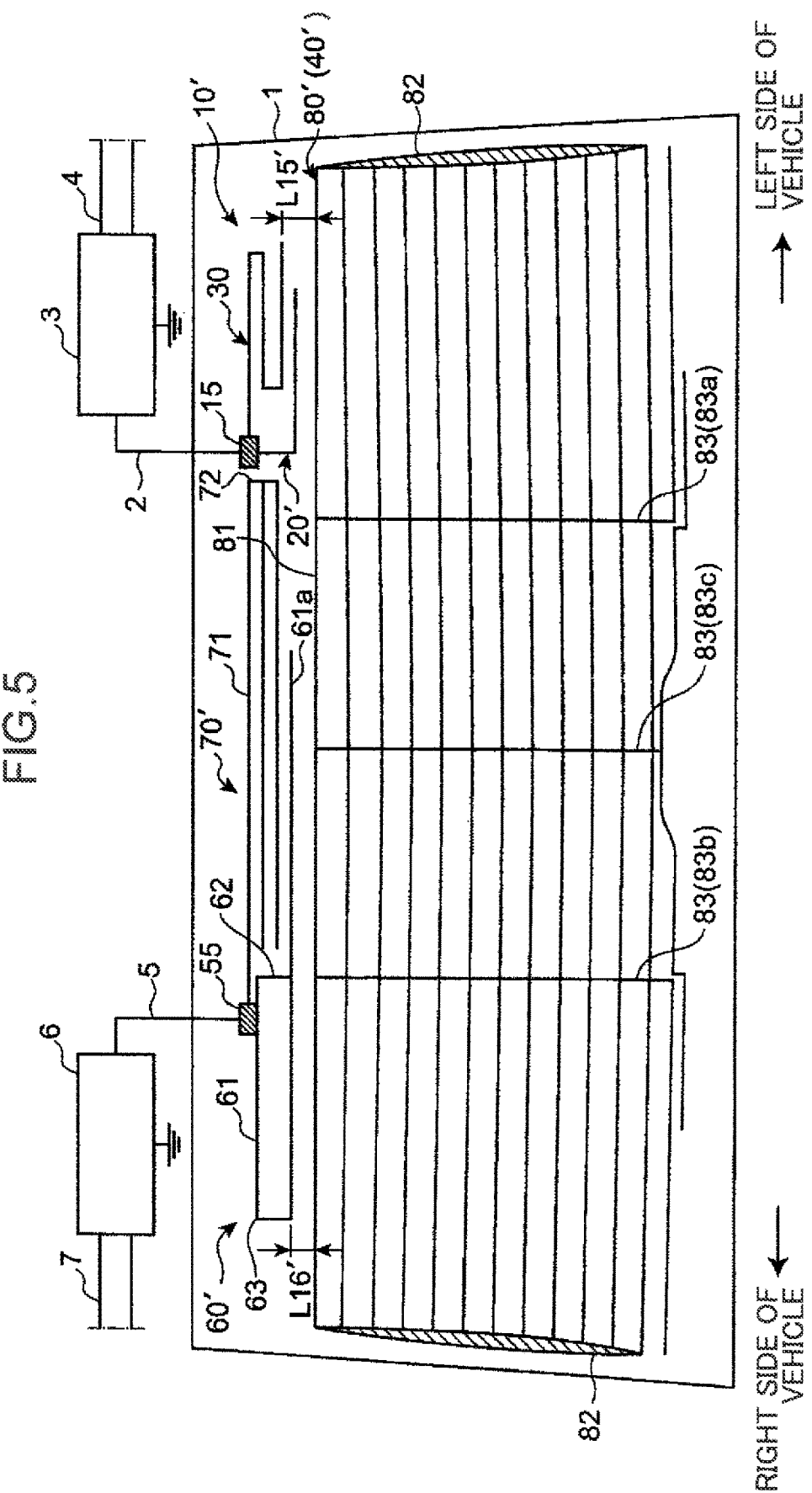
FIG. 5 is a schematic view of a glass antenna according to the second embodiment.

FIG. 5 is a schematic view of a glass antenna 10' according to the second embodiment. With regard to the glass antenna 10', a defogger 80' is used as a second antenna 40' which is situated below the coupling element 30 so as to be capacitively coupled to the coupling element 30. Description of the first embodiment is applicable to common configurations with the glass antenna 10.

As shown in FIG. 5, the glass antenna 10' according to the second embodiment includes the feeding terminal 15, a first antenna 20', the coupling element 30 and the second antenna 40'. The feeding terminal 15 is situated on an upper side of the rear window glass 1 (i.e. in a region above the virtual horizontal plane extending through the center of the rear window glass 1). The feeding terminal 15 is situated in a left region of the rear window glass 1 (i.e. in a region on the left of the virtual vertical plane extending through the center of the rear window glass 1). The first antenna 20' is connected to the feeding terminal 15. The coupling element 30 is connected to the feeding terminal 15. The second antenna 40' is situated below the coupling element 30. The second antenna 40' is capacitively coupled to the coupling element 30.

The first antenna 20' of the glass antenna 10' has a vertical portion extending downward from the feeding terminal 15; and a horizontal portion extending leftward from the lower end of the vertical portion. In short, the first antenna 20' is formed generally in an L-shape. The feeding terminal 15 is connected to the upper end of the vertical portion of the first antenna 20'.

The first antenna 20' is set so as to receive radio frequency signals in the first frequency band which has the first wavelength at the central frequency of the first frequency band. With regard to the present embodiment, the first antenna 20' is a digital radio antenna set so as to receive digital radio broadcasts in the first frequency band (digital radio broadcast band) of 174 to 240 MHz of which central frequency is 207 MHz. The length of the first antenna 20' is set to 170 mm. The first antenna 20' may receive digital radio broadcasts in the first frequency band of 174 to 240 MHz in cooperation with the antenna connection wire 2 with a length of about 150 mm that functions as a part of the antenna. The principles of the present embodiment are not limited to particular lengths of the first antenna 20' and the antenna connection wire 2.

A radio wave in the first frequency band received by the first antenna 20' of the glass antenna 10' is transmitted from the feeding terminal 15 to the receiver. The radio wave in the first frequency band transmitted from the feeding terminal 15 to the receiver is amplified by the antenna amplifier 3.

Like the glass antenna 10 according to the first embodiment, the coupling element 30 extends leftward from the feeding terminal 15. The coupling element 30 is situated on the left of the feeding terminal 15. The coupling element 30 has a length set on the basis of a length obtained by multiplying one-half of the first wavelength by a glass reduction rate $\alpha$ of the rear window glass 1, the first wavelength being a wavelength at the central frequency of the first frequency band (with regard to the present embodiment, 174 to 240 MHz) which is set so as to be received by the first antenna 20'.

With regard to the present embodiment, the length of the coupling element 30 is 500 mm. However, the principles of the present embodiment are not limited to a particular length of the coupling element 30. For example, a length within a predetermined range (e.g. ±2%) around a length obtained by multiplying one-half of the first wavelength by the glass reduction rate $\alpha$ of the rear window glass 1 may be set as the length of the coupling element 30, the first wavelength being a wavelength at the central frequency of the first frequency band of 174 to 240 MHz.

A defogger 80' is arranged on the rear window glass 1. The defogger 80' is arranged over an area extending from one side (left region) to the other side (right region) in the vehicle width direction of the rear window glass 1. The first antenna 20', the feeding terminal 15 and the coupling element 30 are situated above the defogger 80'.

The second antenna 40' of the glass antenna 10' is composed of the defogger 80'. The defogger 80' is distant below from the coupling element 30 so that there is capacitive coupling between the defogger 80' and the coupling element 30. With regard to the present embodiment, the distance L15' between the coupling element 30 and the defogger 80' is set to 20 mm. However, the principles of the present embodiment are not limited to a particular distance between the coupling element 30 and the defogger 80'.

The defogger 80' is set so as to receive radio frequency signals in the second frequency band which has the second wavelength at the central frequency of the second frequency band. With regard to the present embodiment, the defogger 80' functions as an FM antenna set so as to receive FM radio broadcasts in the second frequency band (FM radio broadcast band) of 88 to 108 MHz of which central frequency is 98 MHz. However, the principles of the present embodiment are not limited to a particular central frequency and a particular second frequency band.

The defogger 80' includes heater wires 81 extending from the left region to right region of the rear window glass 1. The heater wires 81 are substantially parallel to each other. The heater wires 81 are symmetrically arranged. The defogger 80' further includes the pair of bus bars 82. The left bus bar 82 extends vertically and passes through the left ends of the heater wires 81. The right bus bar 82 extends vertically and passes through the right ends of the heater wires 81. When a current is supplied to the heater wires 81 from a power supply (not shown) through the bus bars 82, the defogger 80' may defog the rear window glass 1.

The defogger 80' further includes the conductive wires 83 (83*a*, 83*b*, 83*c*). The conductive wires 83 are connected to the uppermost heater wire 81 among the heater wires 81. The conductive wires 83 extend downward and intersect the heater wires 81. With regard to the present embodiment, the conductive wire 83*a* is situated in the left region of the rear window glass 1. The conductive wire 83*b* is situated in the right region of the rear window glass 1. The conductive wire 83*c* is situated in the central region of the rear window glass 1.

The conductive wire 83*a* includes a vertical portion extending downward so as to go across the lower most heater wire 81; and a left horizontal portion extending leftward from the lower end of the vertical portion. The conductive wire 83*b* includes a vertical portion extending downward so as to go across the lowermost heater wire 81; and a right horizontal portion extending rightward from the lower end of the vertical portion. The conductive wire 83*c* includes a vertical portion extending downward so as to go across the lowermost heater wire 81; a left horizontal portion extending leftward from the lower end of the vertical portion; and a right horizontal portion extending rightward from the lower end of the vertical portion.

With regard to the present embodiment, the heater wires 81 and the conductive wires 83 of the defogger 80' are set so as to receive FM radio broadcasts in the second frequency band (FM radio broadcast band) of 88 to 108 MHz of which central frequency is 98 MHz.

The second antenna 40' composed of the defogger 80' of the glass antenna 10' is capacitively coupled to the coupling element 30 which is connected to the feeding terminal 15. A radio wave in the second frequency band received by the second antenna 40' is transmitted from the feeding terminal 15 to the receiver. The radio wave in the second frequency band transmitted from the feeding terminal 15 to the receiver is amplified by the antenna amplifier 3.

As shown in FIG. 5, the glass antenna 10' includes a third antenna 60' situated on an upper side of the rear window glass 1. The third antenna 60' is connected to the feeding terminal 55 in the right region of the rear window glass 1. The third antenna 60' is set so as to receive radio frequency signals in the third frequency band which has the third wavelength at the central frequency of the third frequency band. The third antenna 60' is an FM antenna set so as to receive FM radio broadcasts in the third frequency band (FM radio broadcast band) of 88 to 108 MHz of which central frequency is 98 MHz.

The feeding terminal 55 is connected to the top of the third antenna 60'. The third antenna 60' includes substantially horizontal lateral portions 61 extending parallel to each other. The lateral portions 61 include a first lateral portion on an upper side and a second lateral portion below the first lateral portion. The third antenna 60' further includes a first longitudinal portion 62 which connects the left ends of the lateral portions 61; and a second longitudinal portion 63 which connects the right ends of the lateral portions 61. The second lateral portion 61 on a lower side includes an extension portion 61*a* extending leftward from the lower end of the first longitudinal portion 62.

The lateral portions 61, the first longitudinal portion 62 and the third longitudinal portion 63 of the third antenna 60' are set so as to receive FM radio broadcasts in the second frequency band (FM radio broadcast band) of 88 to 108 MHz of which central frequency is 98 MHz. A radio wave in the third frequency band received by the third antenna 60' is transmitted from the feeding terminal 55 to the receiver. The radio wave in the third frequency band transmitted from the feeding terminal 55 to the receiver is amplified by the antenna amplifier 6.

The defogger 80' is distant below from the third antenna 60' so that there is capacitive coupling between the defogger 80' and the third antenna 60'. With regard to the present embodiment, a distance L16' between the defogger 80' and the third antenna 60' is set to 10 mm. However, the principles of the present embodiment are not limited to a particular distance between the defogger 80' and the third antenna 60'.

A fourth antenna 70' is connected to the feeding terminal 55. The fourth antenna 70' extends leftward from the feeding terminal 55. In short, the fourth antenna 70' is situated on the left of the third antenna 60'. The fourth antenna 70' is situated on the right of the first antenna 20'. The fourth antenna 70' is situated on an upper side of the rear window glass 1. The fourth antenna 70' is situated in a central region in the vehicle width direction of the rear window glass 1 (i.e. in a region between the first and third antennas 20', 60').

The fourth antenna 70' is set so as to receive AM radio broadcasts in the fourth frequency band (AM radio broadcast band) of 500 to 1700 kHz in cooperation with the third antenna 60'. The fourth antenna 70' includes substantially horizontal lateral portions 71 extending parallel to each other. The lateral portions 71 include a first lateral portion, a second lateral portion and a third lateral portion. The first to third lateral portions are arranged at regular intervals. The first lateral portion is situated at the highest position among the lateral portions 71. The third lateral portion is situated at the lowest position among the lateral portions 71. The fourth antenna 70' includes a longitudinal portion 72 extending vertically and connecting the left ends of the lateral portions 71.

A radio wave in the fourth frequency band received by the third and fourth antennas 60', 70' of the glass antenna 10' is transmitted from the feeding terminal 55 to the receiver. The radio wave in the fourth frequency band transmitted from the feeding terminal 55 to the receiver is amplified by the antenna amplifier 6.

The glass antenna 10' according to the present embodiment includes the first antenna 20', the coupling element 30 and the second antenna 40'. The feeding terminal 15 is connected to the antenna amplifier 3. The first antenna 20' is connected to the feeding terminal 15. The first antenna 20' is set so as to receive radio frequency signals in the first frequency band which has the first wavelength at the central frequency of the first frequency band. The coupling element 30 has a length set on the basis of a length obtained by multiplying one-half of the first wavelength by the glass reduction rate. The coupling element 30 is connected to the feeding terminal 15. The second antenna 40' is capacitively coupled to the coupling element 30. The second antenna 40' is set so as to receive radio frequency signals in the second frequency band which has the second wavelength at the central frequency of the second frequency band.

Since the feeding terminal 15, to which the first antenna 20' is connected, is connected to the coupling element 30 having a length set on the basis of a length obtained by multiplying one-half of the wavelength at the central frequency of the first frequency band by the glass reduction rate, the glass antenna 10' may have high or infinite impedance in the first frequency band. The coupling element 30 is capacitively coupled to the second antenna 40' which is set so as to receive the second frequency band different from the first frequency band. The wavelength at the central frequency of the second frequency band is the second wavelength different from the first wavelength. Therefore, the glass antenna 10' may maintain higher receipt sensitivity of the first and second antennas 20' than a structure in which the first and second antennas 20', 40' are connected to the feeding terminal 15. For example, the glass antenna 10' may allow the two antennas, which receive radio frequency signals such as VHF of 30 to 300 MHz, to share an antenna amplifier and a feeding terminal, and may maintain high receipt sensitivity of the two antennas.

The first antenna 20' is a digital radio antenna which is set so as to receive digital radio broadcasts whereas the second antenna 40' is an FM antenna which is set so as to receive FM radio broadcasts. Therefore, the glass antenna 10' may allow the digital radio antenna and the FM antenna to share an antenna amplifier and a feeding terminal, and may maintain high receipt sensitivity of the digital radio antenna and the FM antenna.

With regard to the glass antenna 10', the defogger 80' is situated below the coupling element 30 and used as the second antenna 40' which is capacitively coupled to the coupling element 30. Therefore, the glass antenna 10' may require a narrower arrangement space than a structure in which a second antenna and a defogger are separately arranged. Even if a vertical size of the rear window glass 1 is small, the glass antenna 10' may allow the first and second antennas 20', 40' to share an antenna amplifier and a feeding terminal, and maintain high receipt sensitivity of the first and second antennas 20', 40'.

With regard to the aforementioned embodiments, the glass antennas 10, 10' are arranged on the rear window glass 1 which is exemplified as the vehicular window glass. However, the glass antennas 10, 10' may be arranged on other vehicular window glasses such as a front window glass and a side window glass.

A person skilled in the art may add various modifications and design changes to the principles of the aforementioned embodiments without departing from the spirit and scope of the present invention.

An exemplified glass antenna described in the context of the aforementioned embodiments mainly has the following features.

A glass antenna according to one aspect of the aforementioned embodiments is arranged on a vehicular window glass. The glass antenna includes a first antenna configured to receive a radio frequency signal in a first frequency band which has a first wavelength at a central frequency of the first frequency band; a coupling element having a length set on the basis of a length obtained by multiplying one-half of the first wavelength by a glass reduction rate defined as a value which is obtained by dividing a propagation velocity of a radio wave in the vehicular window glass by a propagation velocity of the radio wave in air; a feeding terminal connected to an antenna amplifier, the first antenna and the coupling element and a second antenna configured to receive a radio frequency signal in a second frequency band which has a second wavelength at a central frequency of the second frequency band and send the received radio frequency signal to the antenna amplifier thorough the coupling element to which the second antenna is capacitively coupled and the feeding terminal.

According to the aforementioned configuration, since the coupling element having a length set on the basis of a length obtained by multiplying one-half of the central frequency wavelength of the first frequency band by the glass reduction rate is connected to the feeding terminal to which the first antenna is connected, impedance in the first frequency band is infinite or high. Since the second antenna set so as to receive the second frequency band, which is different from the first frequency band in the second wavelength different from the first wavelength at the central frequency of the first frequency is capacitively coupled to the coupling element, a reduction in receipt sensitivity is less likely to happen to the first and second antennas than a structure in which the first and second antennas are connected to the feeding terminal. Therefore, not only the antenna amplifier and the feeding terminal are shared by the first and second antennas but also the reduction in receipt sensitivity of the first and second antennas is suppressed. The antenna amplifier and the feeding terminal may be shared by two antennas which receive radio frequency signals such as VHF of 30 to 300 MHz according to the principles of the aforementioned embodiments. In this case, the two antennas may maintain high receipt sensitivity for radio frequency signals such as VHF of 30 to 300 MHz.

With regard to the aforementioned configuration, the first antenna may be a digital radio antenna set so as to receive a digital radio broadcast. The second antenna may be an FM antenna set so as to receive an FM radio broadcast.

According to the aforementioned configuration, since the first antenna is a digital radio antenna set so as to receive a digital radio broadcast whereas the second antenna is an FM antenna set so as to receive an FM radio broadcast, the antenna amplifier and the feeding terminal are shared by the digital radio antenna and the FM antenna. In addition, the digital radio antenna and the FM antenna may maintain high receipt sensitivity.

With regard to the aforementioned configuration, a defogger may be arranged on the vehicular window glass. The feeding terminal, the first antenna, the coupling element and the second antenna may be situated above the defogger. The feeding terminal may be situated on an upper side of the vehicular window glass.

According to the aforementioned configuration, since the feeding terminal, the first antenna, the coupling element and the second antenna are situated above the defogger and since the feeding terminal is placed on an upper side of the vehicular window glass, the first and second antennas may have high receipt sensitivity.

With regard to the aforementioned configuration, the first antenna may extend in a vertical direction of the vehicular window glass. The feeding terminal may be connected to a top of the first antenna and situated on the upper right or left side of the vehicular window glass. The coupling element may be situated on a right or left side of the feeding terminal. The second antenna may be situated below the coupling element.

According to the aforementioned configuration, since the feeding terminal is connected to the top of the first antenna extending vertically, the feeding terminal may be easily situated on an upper side of the vehicular window glass. Since the feeding terminal is situated on one side of the vehicular window glass in the vehicle width direction and since the coupling element is situated on one side of the feeding terminal in the vehicle width direction, the feeding terminal and the coupling element do not occupy a wide region of the vehicular window glass. Therefore, a designer may easily put the second antenna below the coupling element.

With regard to the aforementioned configuration, the glass antenna may further include a third antenna set so as to receive a radio frequency signal in a third frequency band which has a third wavelength at a central frequency of the third frequency. The third antenna may be situated on an upper left or right side of the vehicular window glass. The second antenna may be distant from the third antenna.

According to the aforementioned configuration, since the feeding terminal is situated on one side of the vehicular window glass in the vehicle width direction and since the coupling element is situated on one side of the feeding terminal in the vehicle width direction, a designer may utilize the other side of the vehicular window glass to put the third antenna. Since the third antenna is situated on an upper side of the vehicular window glass, the designer may easily place the third antenna to be distant from the second antenna which is arranged below the coupling element situated on one side in the vehicle width direction.

With regard to the aforementioned configuration, the second wavelength may be equal to the third wavelength. The second frequency band may be equal to the third frequency band.

According to the aforementioned configuration, since the second wavelength is equal to the third wavelength and since the second frequency band is equal to the third frequency band, the second and third antennas may have a diversity structure. Therefore, the glass antenna may have high receipt sensitivity for radio frequency signals in the second frequency band.

With regard to the aforementioned configuration, the defogger arranged on the vehicular window glass may be situated on a side below the second and third antennas. The second and third antennas may be capacitively coupled to the defogger.

According to the aforementioned configuration, since the second and third antennas are capacitively coupled to the defogger arranged on the vehicular window glass, the defogger may function as an antenna which helps the second and third antennas. Consequently, the second and third antennas may have high receipt sensitivity.

INDUSTRIAL APPLICABILITY

The principles of the aforementioned embodiments are suitably utilized in a field of manufacturing technologies for vehicles on which glass antennas are arranged.

The invention claimed is:

1. A glass antenna arranged on a vehicular window glass, the glass antenna comprising:
   a first antenna configured to receive a radio frequency signal in a first frequency band which has a first wavelength at a central frequency of the first frequency band;
   a coupling element having a length set based on a length obtained by multiplying one-half of the first wavelength by a glass reduction rate defined as a value which is obtained by dividing a propagation velocity of a radio wave in the vehicular window glass by a propagation velocity of the radio wave in air;
   a feeding terminal connected to an antenna amplifier, the first antenna and the coupling element; and
   a second antenna configured to receive a radio frequency signal in a second frequency band which has a second wavelength at a central frequency of the second frequency band and send the received radio frequency signal to the antenna amplifier through the coupling element to which the second antenna is capacitively coupled.

2. The glass antenna according to claim 1,
   wherein the first antenna is a digital radio antenna set so as to receive a digital radio broadcast, and
   wherein the second antenna is an FM antenna set so as to receive an FM radio broadcast.

3. The glass antenna according to claim 1,
   wherein a defogger is situated on the vehicular window glass,
   wherein the feeding terminal, the first antenna, the coupling element and the second antenna are situated above the defogger, and
   wherein the feeding terminal is situated on an upper side of the vehicular window glass.

4. The glass antenna according to claim 3,
wherein the first antenna extends in a vertical direction of the vehicular window glass,
wherein the feeding terminal is connected to a top of the first antenna and situated on an upper right or left side of the vehicular window glass,
wherein the coupling element is situated on a right or left side of the feeding terminal, and
wherein the second antenna is situated below the coupling element.

5. The glass antenna according to claim 4, further comprising
a third antenna set so as to receive a radio frequency signal in a third frequency band which has a third wavelength at a central frequency of the third frequency band,
wherein the third antenna is situated on an upper left or right side of the vehicular window glass, and
wherein the second antenna is distant from the third antenna.

6. The glass antenna according to claim 5,
wherein the second wavelength is equal to the third wavelength, and
wherein the second frequency band is equal to the third frequency band.

7. The glass antenna according to claim 5,
wherein the defogger arranged on the vehicular window glass is situated on a side below the second and third antennas, and
wherein the second and third antennas are capacitively coupled to the defogger.

* * * * *